US009792943B2

(12) United States Patent
Liebezeit

(10) Patent No.: US 9,792,943 B2
(45) Date of Patent: Oct. 17, 2017

(54) METAL TRANSMISSIVE INCREMENTAL ENCODING DISK WITH INDEX GENERATION

(71) Applicant: U.S. Digital Corp., Vancouver, WA (US)

(72) Inventor: Kurt Liebezeit, Vancouver, WA (US)

(73) Assignee: U.S. Digital Corp., Vancouver, WA (US)

( * ) Notice: Subject to any disclaimer, the term of this patent is extended or adjusted under 35 U.S.C. 154(b) by 229 days.

(21) Appl. No.: 14/744,338

(22) Filed: Jun. 19, 2015

(65) Prior Publication Data

US 2016/0372149 A1    Dec. 22, 2016

(51) Int. Cl.
*G01D 5/34* (2006.01)
*G11B 7/24073* (2013.01)

(52) U.S. Cl.
CPC .................... *G11B 7/24073* (2013.01)

(58) Field of Classification Search
CPC .. G01D 5/347; G01D 5/34715; G01D 5/3473; G01D 5/34776; G11B 7/24073; G11B 20/1217

USPC ............ 250/231.13, 231.14, 23.181; 341/13; 33/1 PT, 707

See application file for complete search history.

(56) References Cited

U.S. PATENT DOCUMENTS 5,053,618 A  * 10/1991  McElroy ............ G01D 5/34707
                                                              250/231.17
6,563,108 B1 *  5/2003  Stevens .................. G01D 5/366
                                                              250/231.13

* cited by examiner

*Primary Examiner* — Kevin Pyo
(74) *Attorney, Agent, or Firm* — Schaffer IP Law, LLC

(57) ABSTRACT

An optical encoder disk comprising an opaque disk, an outer track adjacent a peripheral edge of the disk, an inner index track defined by a first pattern of radial light-blocking elements subtending an arc within an annular band interposed between the outbound track and an axis of the disk, and an opaque support pattern of non-radial elements located within the annular band outside of the arc in which the index track is located formed of substantially non-radial elements. The inner index track further includes pattern apertures formed through the disk between the light-blocking elements so that light emitted on one face of the disk passes through the pattern apertures and falls upon photodetectors located adjacent an opposite face of the disk.

18 Claims, 16 Drawing Sheets

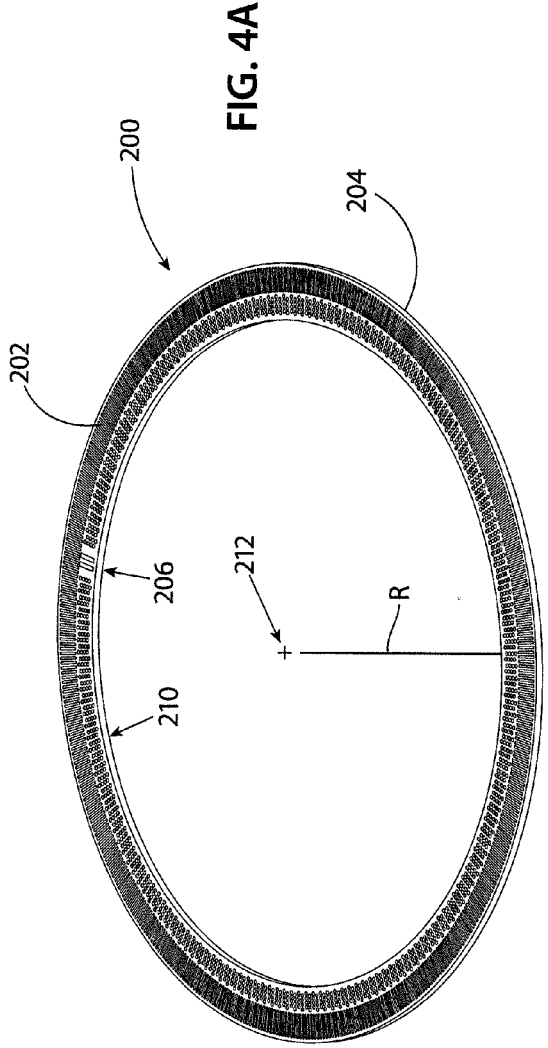
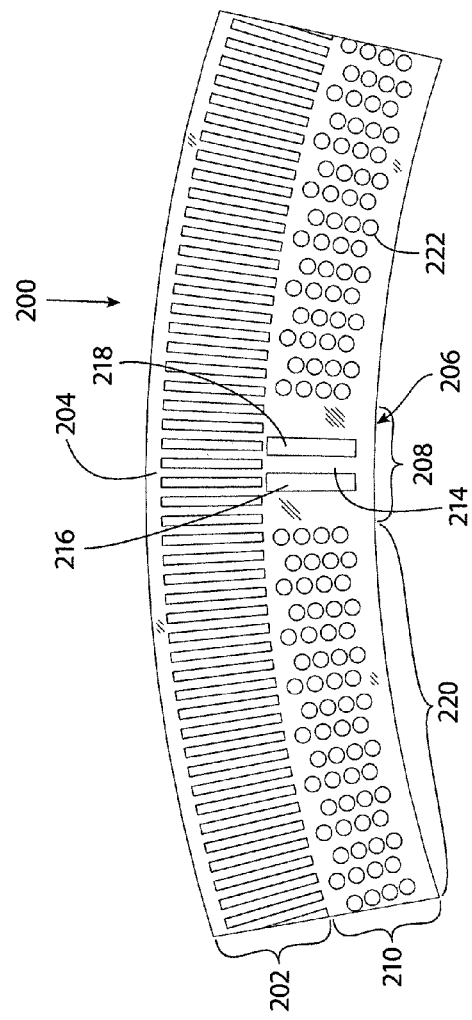
FIG. 4A
FIG. 4B

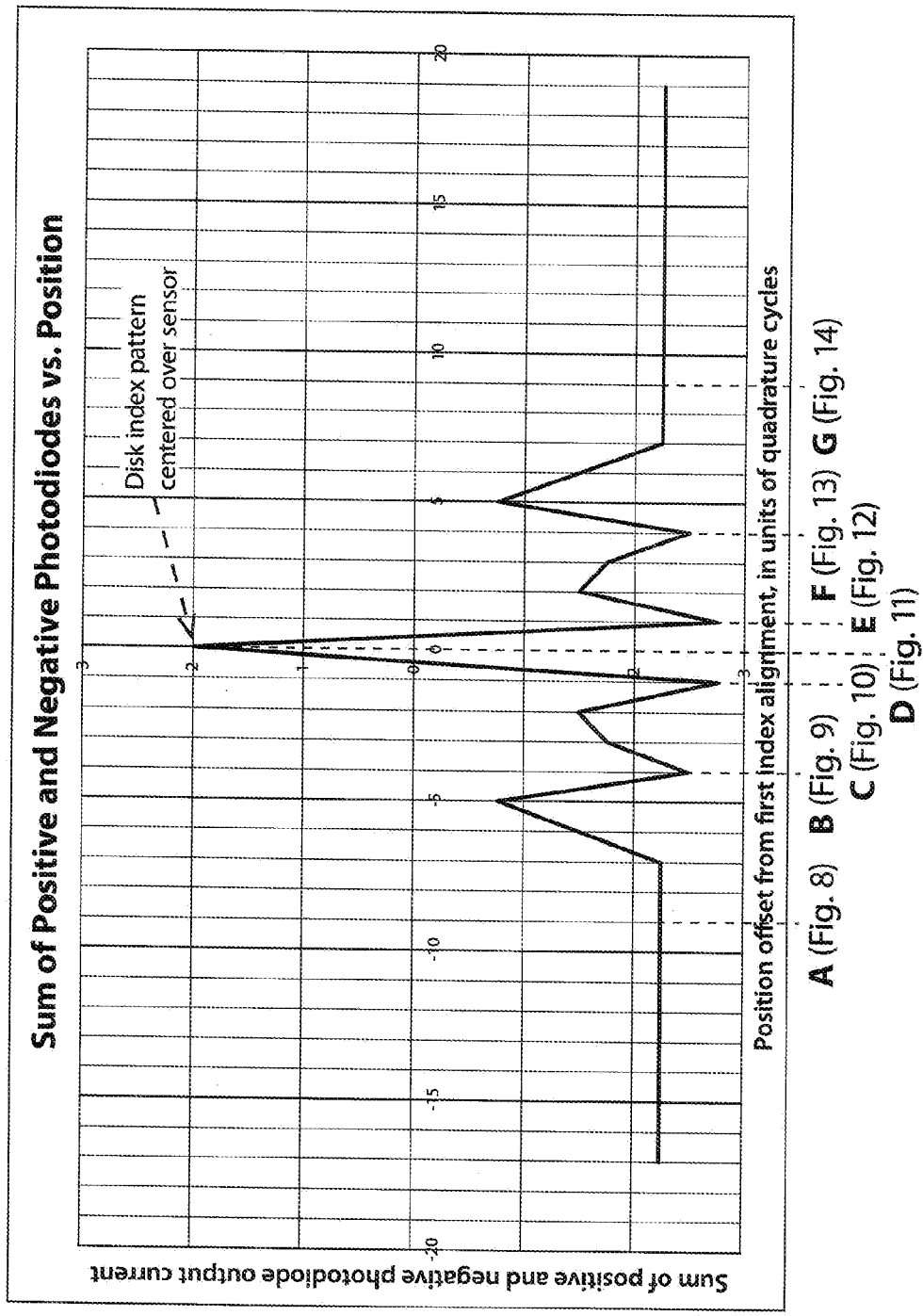

METAL TRANSMISSIVE INCREMENTAL ENCODING DISK WITH INDEX GENERATION

BACKGROUND OF THE INVENTION

This invention relates generally to optical encoders and more particularly to metal encoder disks.

An encoder is an electro-mechanical device used to convert the mechanical position of a shaft or axle to an analogue or digital electrical signal. The analogue or digital signal can then be used to determine position, direction, and velocity of the shaft or axle. Such encoders have been used in rotary switches or control knobs to detect movement of the switch and determine its position with a high degree of accuracy.

An encoder assembly of a transmissive type typically includes light emitters and detectors with an interposed rotating code disk. Light from the emitter (e.g. an LED) is directed toward the detector and interposed rotating code disk. The code disk includes patterned transparent portions and opaque portions arranged radially on the disk that act to alternately transmit and block light from the emitter from being detected by the photo-detectors as the disk rotates and its angular position changes. The encoder is programmed to index a detected position of the switch when certain designated photodetectors are blocked from the emitted light while others are activated. In disks with one or more tracks, each track consists of various combinations of opaque and transparent locations, arranged so that there is a unique combination of opaque and transparent locations along a radius at each possible angular position of code disk. That is, in an absolute position encoder, the photo-detectors will receive a unique pattern of light depending on the angular position of the code disk. Thus, the angular position of code disk can be determined according to which pattern of light is received at the photo-detectors.

In one type of incremental encoder 18 shown in FIG. 1, modules use a single-track index sensor 20 that sits inboard of a quadrature track 22. The index detector portion has two sets of photodiodes: those that drive the index ON (positive photodiodes, a minority of the surface area), and those that drive the index signal OFF (negative photodiodes, a majority of the surface area). The index pattern on the disk is constructed in such a way that at the index position all of the negative diodes are blocked and all of the positive diodes are illuminated, which causes the index to be asserted; at most other points on the disk's rotation, a plurality of negative diodes are illuminated 23 relative to the positive diodes, and the index is held inactive.

A typical code disk is constructed using a transparent plastic 24 with an opaque Mylar pattern 26 overlaid on the disk. On such disks, a ring of transmissive/clear material for the index track is allowed everywhere but where the index position is located; in that area there is a pseudo-random pattern of radial bars and windows that matches the arrangement of the positive and negative photodiodes of the sensor in the encoder module 20. In non-index positions of the disk rotation all of the elements, both negative and positive, are illuminated; because there are more negative photodiode elements, however, the index is kept in the OFF state.

Other types of code disks can be made from metal. Metal disk are desired for temperature compatibility or other reasons. However, metal disks are not naturally transparent so that if most of the index track is left open as a window (matching the window of the Mylar disk), then there is little to support the quadrature track which sits outside the radius of the index track.

FIG. 2 illustrates an examplary metal disk 30 known in the prior art with exterior quadrature track 32 and inboard index track 34. Disk 30 includes a radial index pattern 36 position within a small arc of the disk and a support pattern 38 outside of the arc formed of radially defined support structures and openings. The radial support pattern 38 may inadvertently trigger an index signal if positioned in such a way as to block the diodes of a certain type. This can occur because the orientation of the index pattern (and the underlying sensor pattern) and the support pattern is the same—that is radial—thereby potentially triggering potential false positive results. The presence of the radial support spokes means that it is unavoidable that a radial support spoke will at times cast a shadow on the pattern of the index sensor, and at certain positions will decrease the margin that keeps the index from triggering a false positive result. The other problem with the support spokes is the difficulty of proving that a given spacing and width of support spokes will be guaranteed to not produce false results, especially for complex multi-bit single-track index patterns.

Accordingly, the need arises for alternate designs that enable metal code disks in a transmissive-type encoder to maintaining structural rigidity without inadvertently triggering an index outside of the index points.

SUMMARY OF THE INVENTION

An optical encoder disk comprises an opaque disk, an outer track, an inner index track, and an opaque support pattern. The outer track can be a quadrature track adjacent a peripheral edge of the disk. The inner index track is defined by a first pattern of radial light-blocking elements subtending an arc within an annular band interposed between the outbound track and an axis of the disk. The opaque support pattern includes substantially non-radial elements located within the annular band but outside of the arc in which the index track is located The inner index track further includes pattern apertures formed through the disk between the light-blocking elements so that light emitted on one face of the disk passes through the pattern apertures and falls upon photodetectors located adjacent an opposite face of the disk.

The support pattern is defined by light blocking elements and apertures so that, within any portion of the support pattern equal in width to the arc of the index track, at least a portion of the light emitted onto one face of the disk passes through the apertures of the support pattern and falls upon the photodetectors located adjacent the opposite face of the disk.

In one particular aspect of the invention, the opaque support pattern includes metal spokes slanted with respect to a radial direction of the disk and having a width less than a width of the arc subtended by the inner index track.

In another aspect of the invention, the opaque support pattern includes a honeycomb pattern of apertures formed therethrough so that a plurality of apertures within the honeycomb pattern are defined within any portion of the support pattern equal in width to the arc of the index track.

The inventive encoder disk can be constructed with a metal outer, inner, and middle rim. An outer track having a radial pattern of metal spokes is coupled between the outer and middle rim. The encoder disk further includes an inner track coupled between the inner and middle rim, the inner track having an index pattern of radial spokes of various widths within a subtended arc of the inner track, and a non-radial support pattern, different from the index pattern. The index pattern is configured to match a pattern of a detector in an encoder so that the index pattern masks detectors of a first type. In contrast, the non-radial support pattern is configured to not match a pattern of the detector so that at no point along the support pattern would detectors of the first type be completely masked.

Aspects of the invention also include an optical encoder comprising an encoder disk, light emitter located adjacent one face of the encoder disk, and photodetectors located adjacent an opposite face of the encoder disk from the light emitter.

The encoder disk includes an outer track and inner index track, with the inner track defined within an annular band of the disk and having an index pattern subtending an arc of the annular band. The pattern includes opaque index portions and apertures formed between said portions, and a support pattern within the annular band outside of the index pattern. The light emitter is configured to project light onto the encoder disk and through the apertures. The photodetectors are arranged in a photodetector pattern with an arrangement of a first type of photodetector matched with the patterned opaque index portions and an arrangement of a second type of photodetector matched with the apertures formed between said portions.

The support pattern on the encoder disk includes light blocking elements and apertures configured whereby, within any portion of the support pattern equal in width to the arc of the index pattern, at least a portion of the light emitted onto one face of the disk passes through the apertures of the support pattern and falls upon the photodetectors located adjacent the opposite face of the disk. In this configuration, the support pattern is interposed between the light emitter and the photodetectors so that more light falls on the photodetectors of the first type than of the second type.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 4A is a perspective view of a metal encoder wheel constructed according to a first alternate embodiment of the invention.

FIG. 4B is a magnified plan view of a portion of the metal encoder wheel of FIG. 4A.

FIG. 6 is a graph showing sensor output as a function of angular position of the code wheel using the metal encoder of FIG. 3A.

DETAILED DESCRIPTION

Figure 3A:
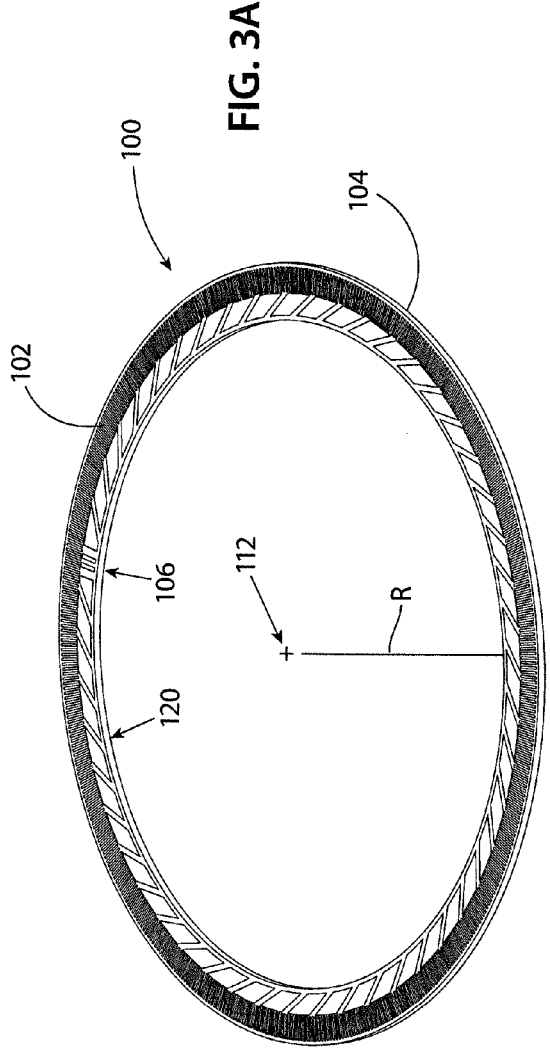
FIG. 3A is a perspective view of a metal encoder wheel constructed according to teachings of the invention.

FIG. 3A illustrates a metal encoder disk 100 as constructed according to teachings of a preferred embodiment of the invention. Disk 100 is formed primarily from a rigid opaque material such as metal that can be shaped with high precision. Disk 100 includes an outer track—for instance a quadrature track 102—adjacent a peripheral edge 104 of the disk. Disk 100 further includes an inner index track 106 subtending an arc 108 within an annular band 110 interposed between the outbound track 102 and an axis 112 of the disk 100.

Figure 3B:
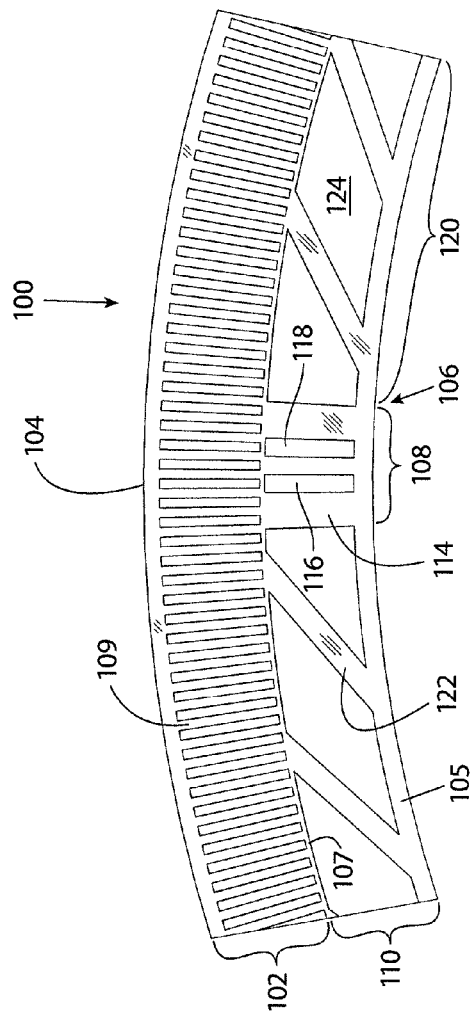
FIG. 3B is a magnified plan view of a portion of the metal encoder wheel of FIG. 3A.

Turning to FIG. 3B, the inner index track 106 is defined by a first pattern of radial light-blocking elements, such as metal strut 114, located at a first angular position of the index track 106 and pattern apertures, such as apertures 116, 118, formed through the disk between the light-blocking elements. Apertures 116, 118 are distinguished from the prior art in that they have an absence of material and are not otherwise formed of a transparent material. The inner index track 106 is configured so that light emitted on one face of the disk 100 passes through the pattern apertures 116, 118 and falls upon photodetectors located adjacent an opposite face of the disk, but light falling on the light-blocking elements is blocked and does not fall upon the photodetectors.

An opaque support pattern 120 of non-radial elements, such as angled metal strut 122, is located within the annular band 110 outside of the arc 108 in which the index track 106 is located. The support pattern 120 is defined by light blocking elements 122 and apertures—such as rhomboid opening 124—so that, within any portion of the support pattern equal in width to the arc 108 of the index track 106, at least a portion of the light emitted onto one face of the disk passes through the apertures of the support pattern 120 and falls upon the photodetectors located adjacent the opposite face of the disk.

Although the opaque material from which the disk is made is preferably metal, such as nickel, other materials can be used with that conform to the spirit of the invention such as stainless steel.

Figure 1:
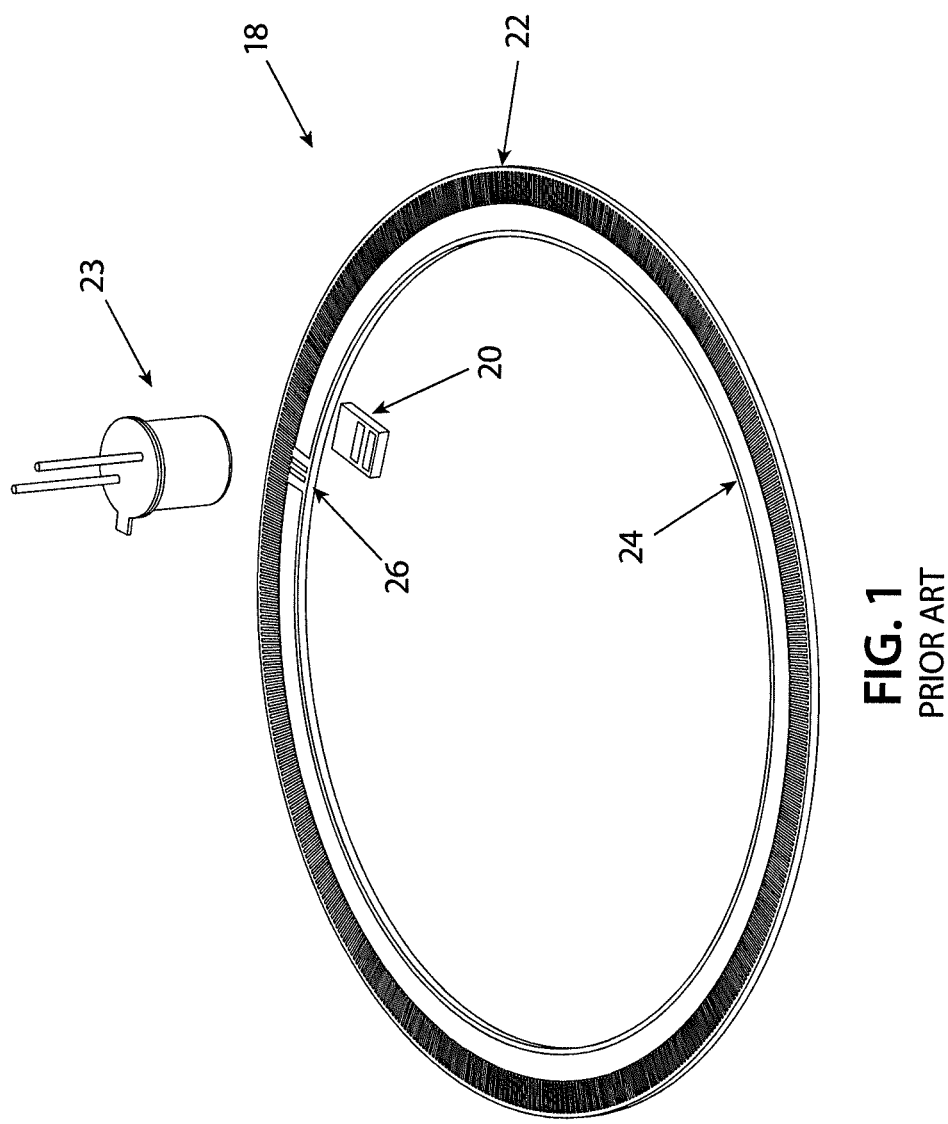
FIG. 1 is a perspective schematic of an incremental encoder known in the prior art.
Figure 2:
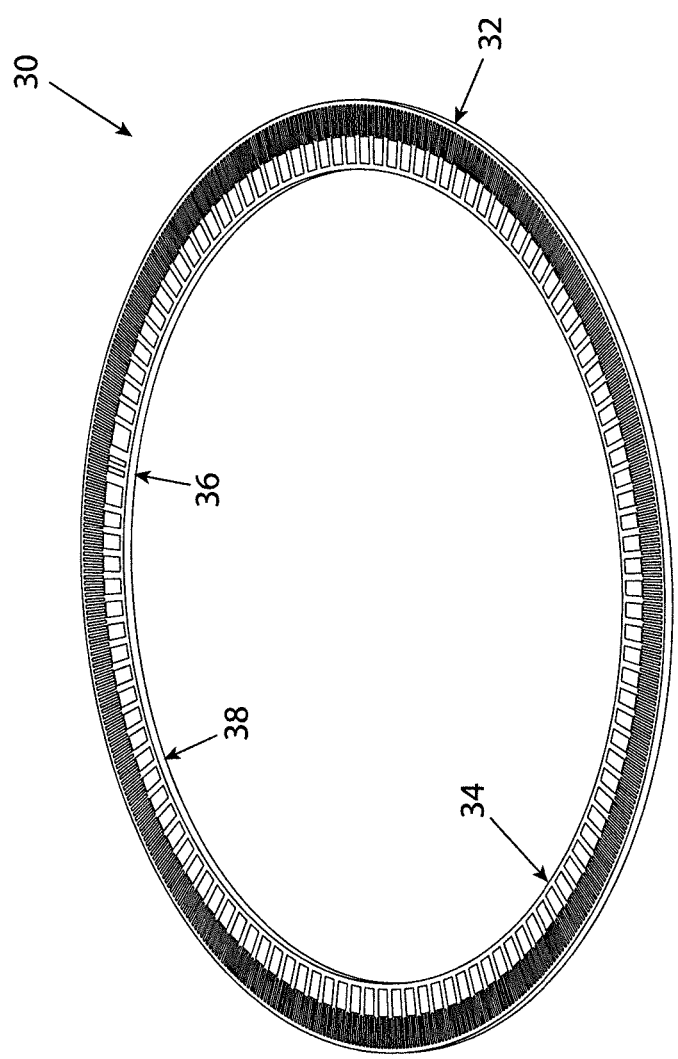
FIG. 2 is a perspective schematic of a metal encoder wheel with a prior art radially-defined support pattern.

In a first embodiment, the opaque support pattern 120 includes metal spokes 122 slanted with respect to a radial direction R of the disk 100. The spokes have a width preferably less than a width of the arc 108 subtended by the inner index track 106 so that at no time is the light directed through the encoder disk 100, such as from illuminator 23 in FIG. 1, completely blocked from reaching the sensor (e.g. sensor 20 in FIG. 1). The spokes and apertures can have various widths and spacings depending upon the design guidelines of the user. Thicker and/or more numerous spokes are mechanically stronger, but they obscure more of the index sensor which typically decreases operational margin at low temperature and/or low LED light output due to aging. Preferably, however, the spoke subtends an angle equal to the angle of the index, and the width of the spoke is such that the worst case obscuration of the index sensor is around 20%. In a typical implementation, a radial line drawn from the center of rotation would typically pass through at most one slanted spoke. Alternate embodiments include a repeating pattern of honeycombed openings, a random or pseudo-random pattern of honeycombed openings, slanted spokes, and cross-hatched spokes.

Figure 13:
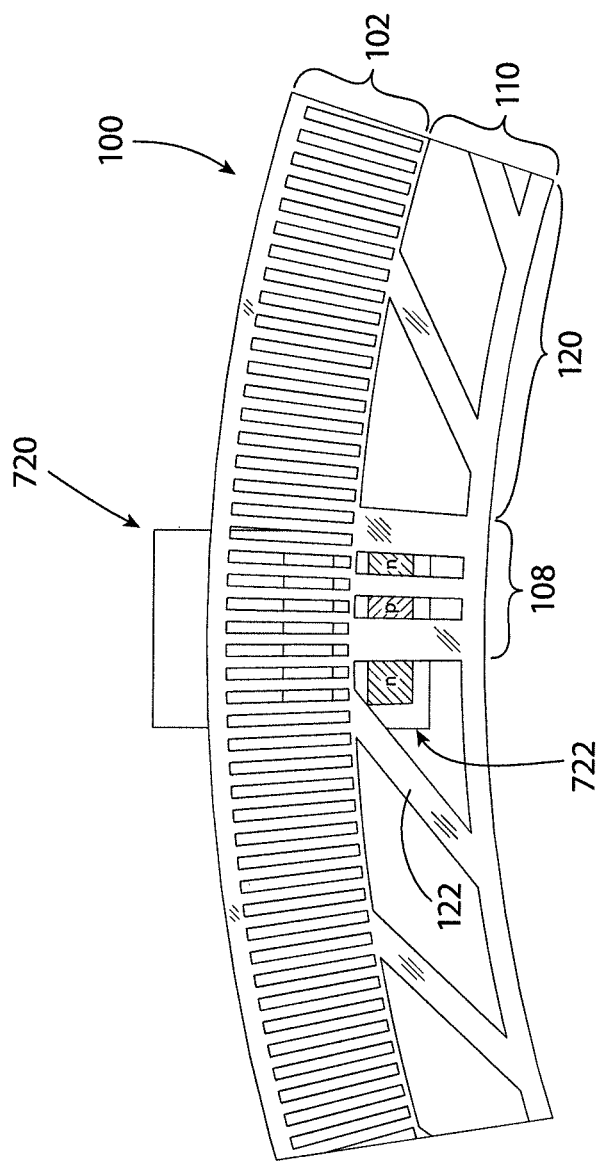
FIG. 13 is a plan view showing the relationship of the metal code wheel of FIG. 3A to the sensor of FIG. 7 at rotation point F on the graph of FIG. 6.

The inventive encoder disk 100 can be constructed with a metal outer 104, inner 105, and middle rim 107. An outer track 102, having a radial pattern of metal spokes—such as spoke 109—is coupled between the outer 104 and middle 107 rims. The encoder disk further includes an inner track 110 coupled between the inner 105 and middle 107 rims. The inner track 110 includes an index pattern 108 formed of radially defined light blocking elements of various widths—see, e.g. how spoke 114 is different in width from the middle spoke of the pattern 108—within a subtended arc of the inner track, and a non-radial support pattern 120, different from the index pattern 108. The index pattern is configured to match a pattern of a detector in an encoder so that the index pattern masks detectors of a first type. In contrast, the non-radial support pattern is configured to not match a pattern of the detector so that at no point along the support pattern would detectors of the first type be completely masked. The non-radial support pattern preferably include some tangential component so that the light blocking elements of the support pattern—e.g. angled spoke 122—falls obliquely across multiple photodetector zones such as shown in FIG. 13.

FIG. 4A shows a second embodiment of the encoder disk 200. Disk 200 includes an outer track—for instance a quadrature track 202—adjacent a peripheral edge 204 of the disk. Disk 200 further includes an inner index track 206 subtending an arc 208 within an annular band 210 interposed between the outbound track and an axis 212 of the disk 200.

The inner index track 206 is defined by a first pattern of radial light-blocking elements, such as metal strut 214, located at a first angular position of the index track 106 and pattern apertures, such as apertures 216, 218, formed through the disk between the light-blocking elements. The inner index track 206 is configured so that light emitted on one face of the disk 200 passes through the pattern apertures 216, 218 and falls upon photodetectors located adjacent an opposite face of the disk, but light falling on the light-blocking elements is blocked and does not fall upon the photodetectors.

The inner index track 206 is defined by a second pattern of radial light-blocking elements with spokes 214 and apertures of various widths conforming to a pattern of photodetectors on a sensor as described below in connection with FIGS. 5-13.

The inner annular band 210 further includes an opaque support pattern of non-radial elements, such as honeycomb pattern 220, formed of overlapping rows and/or columns of apertures 222. The honeycomb pattern 220 is structured to let a somewhat constant amount of illumination fall onto the sensor, positioned immediately below the disk 200, and all rotation positions where the honeycomb pattern and the sensor underneath it is illuminated. The honeycomb pattern 220 is structured differently from the index track 206 so that the non-aperture portions of the honeycomb pattern 220, such as between the columns of apertures, is no wider than the radial light blocking element 214 of the index pattern 206. With such small apertures in the honeycomb pattern 220 formed through the disk, at least a large plurality of such apertures are defined within any subtended arc equal to the arc 108 of the index pattern 106. An advantage of this configuration is that it helps prevent a false index detection where the support pattern may inadvertently block light from falling onto a negative photodiode column of the sensor. Similarly, the apertures 222 in the honeycomb are preferably narrower in width that the arc 208 subtended by the index track 206 so that at any angle of code wheel rotation at least a portion of the photodetector index pattern is blocked.

Figure 5A:
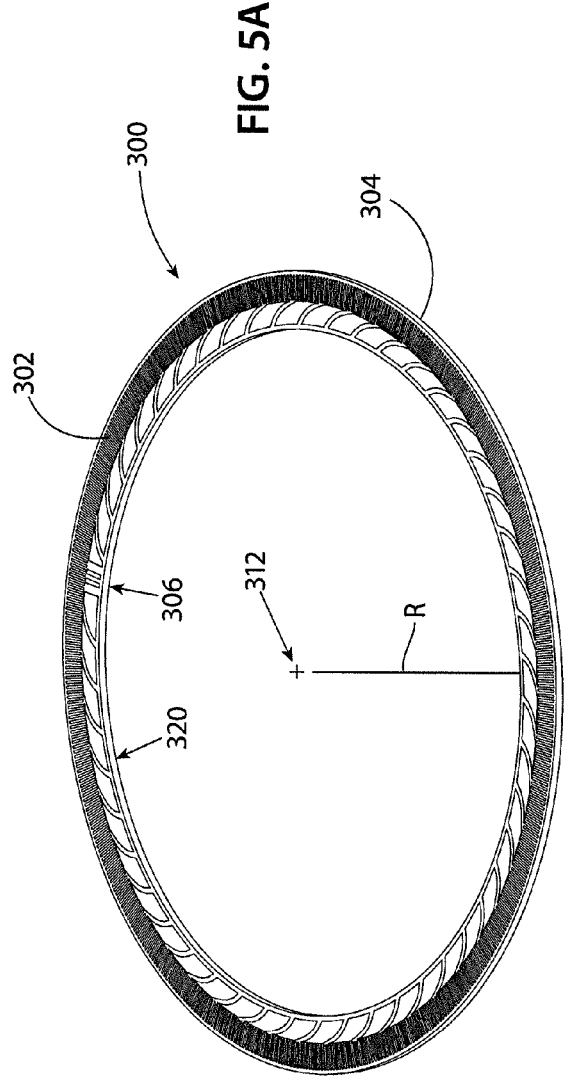
FIG. 5A is a perspective view of a metal encoder wheel constructed according to a second alternate embodiment of the invention.

FIG. 5A illustrates a metal encoder disk 300 as constructed according to teachings of a third embodiment of the invention. Disk 300 is formed primarily from a rigid opaque material such as metal that can be shaped with high precision. Disk 300 includes an outer track—for instance a quadrature track 302—adjacent a peripheral edge 304 of the disk. Disk 300 further includes an inner index track 306 subtending an arc 308 within an annular band 310 interposed between the outbound track and an axis 312 of the disk 300.

Figure 5B:
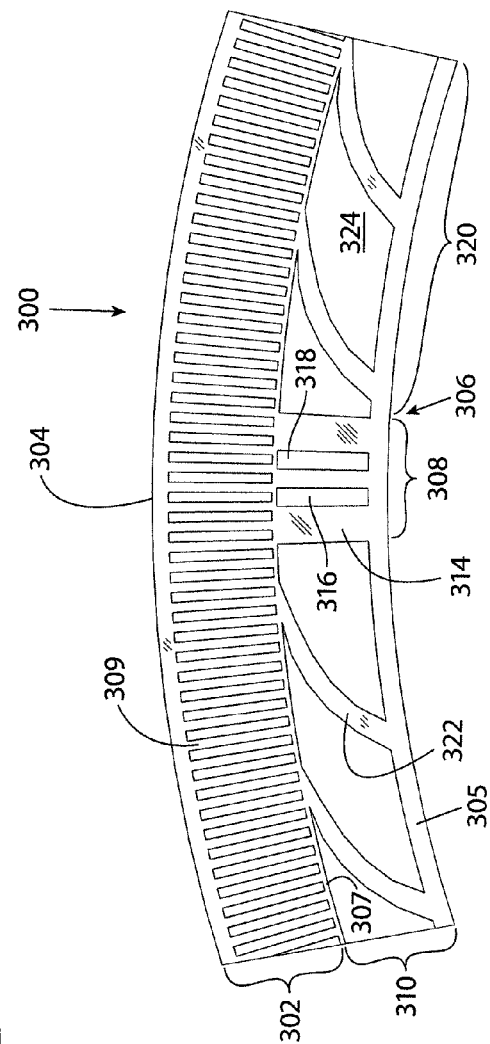
FIG. 5B is a magnified plan view of a portion of the metal encoder wheel of FIG. 5A.

Turning next to FIG. 5B, the inner index track 306 is defined by a first pattern of radial light-blocking elements, such as metal strut 314, located at a first angular position of the index track 306 and pattern apertures, such as apertures 316, 318, formed through the disk between the light-blocking elements. The inner index track 306 is configured so that light emitted on one face of the disk 300 passes through the pattern apertures 316, 318 and falls upon photodetectors located adjacent an opposite face of the disk, but light falling on the light-blocking elements is blocked and does not fall upon the photodetectors.

An opaque support pattern 320 of non-radial elements, such as curved metal strut 322, is located within the annular band 310 outside of the arc 308 in which the index track 306 is located. The support pattern 320 is defined by light blocking elements 322 and apertures—such as curved opening 324—so that, within any portion of the support pattern equal in width to the arc 308 of the index track 306, at least a portion of the light emitted onto one face of the disk passes through the apertures of the support pattern 320 and falls upon the photodetectors located adjacent the opposite face of the disk.

In a third embodiment, the opaque support pattern 320 includes metal spokes 322 curved away from any radial direction R of the disk 300. The spokes have a width preferably less than a width of the arc 308 subtended by the inner index track 306 so that at no time is the light directed through the encoder disk 300, such as from illuminator 23 in FIG. 1, completely blocked from reaching the sensor (e.g. sensor 20 in FIG. 1). In a preferred implementation, the spokes would be chosen so that the obscuration of the index sensor would be around 20%, and the angle subtended by the curved spoke, relative to the center of rotation would approximately equal the angle subtended by the index sensor pattern.

FIG. 6 is a graph illustrating the sum of the positive and negative photodiode signals plotted against rotation position of the metal encoding disk of the invention. The graph shows a baseline current on either side of a signal peak. The baseline current is due to an averaged blocking of both types of photodiodes by the support structure of the inner track outside of the index portion of the track. As negative photodiodes prevail in the sensor being blocked, an averaged blocking will result in a negative/low signal as shown on left and right sides of the signal plot. At the index position '0', however, the index blocking structures—e.g. index track 106—aligns with the negative diode pattern on the sensor thus exposing only the positive photodiodes to the illumination. The result is a positive/high signal showing a well-defined peak.

Figure 7:
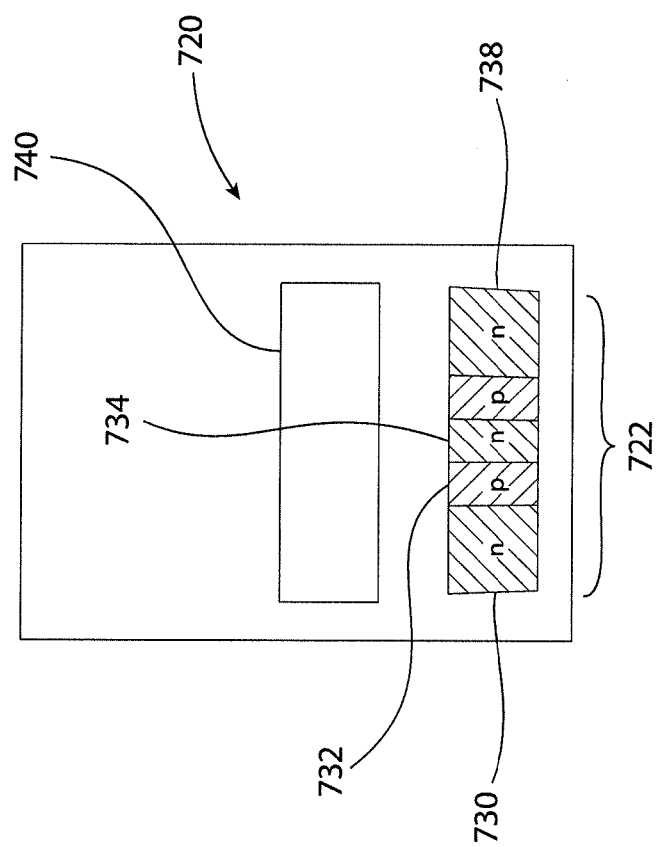
FIG. 7 is a plan view schematic of the sensor showing the pattern of positive and negative index photodiodes disposed thereon.

FIG. 7 is a plan view of a sensor 720 positioned within the optical encoder opposite a light emitter 23, with the code wheel—e.g. code disk 100—interposed between them. The sensor includes a pattern of photodetectors 722 located adjacent an opposite face of the encoder disk from the light emitter. The photodetectors 722 are arranged in a photodetector pattern with an arrangement of a first type of photodetector (e.g. negative photodetectors) matched with the patterned opaque index portions—e.g. radial struts 114—and an arrangement of a second type of photodetector (e.g. positive photodetectors) matched with the apertures formed between said portions—e.g. apertures 116, 118. The photodetector pattern includes blocks of photodetector types—here, from left to right, a wide n-block 730, a narrow p-block 732, a narrow n-block 734, a narrow p-block 736, and a wide n-block 738. The photodetectors 722 are aligned with the inner track of code disk 100, e.g. track 110. Sensor 720 further includes a second block of photodetectors 740 align with the outer track of code disk 100, e.g. track 102.

In a preferred embodiment, the photodiodes include negative photodiodes n and positive photodiodes p arranged in a linear pattern so that a first type of photodetector is a negative photodiode and the second type of photodetector is a positive photodiode. In one embodiment, the first type and second type of photodetectors have a different total population so that total blockage of the higher population group results in a well-defined peak or trough. This is illustrated, for instance, in the pattern shown in FIG. 7 where the area populated by the n-type photodiodes is much greater than that of the p-type photodiodes. As a result, the additive current of the whole sensor is likely low unless most of the n-type photodetectors are blocked as described below. Because the purpose of the index pattern is to trigger an index by blocking light from the high-population n-detectors 730, 732, 734, 736, and 738, the index pattern would likewise have greater light blocking areas across the expanse of the pattern than light transmitting areas—e.g. the total collective widths of the opaque metal struts 114 is greater than the total collective widths of the apertures 116, 118—to match the population and/or pattern of the different types of photodiodes on the sensor. An index would then be asserted only when a substantial amount of the photodetectors of the first type are blocked from receiving light from the emitter by the patterned opaque index portions as shown in the figures.

Figure 11:
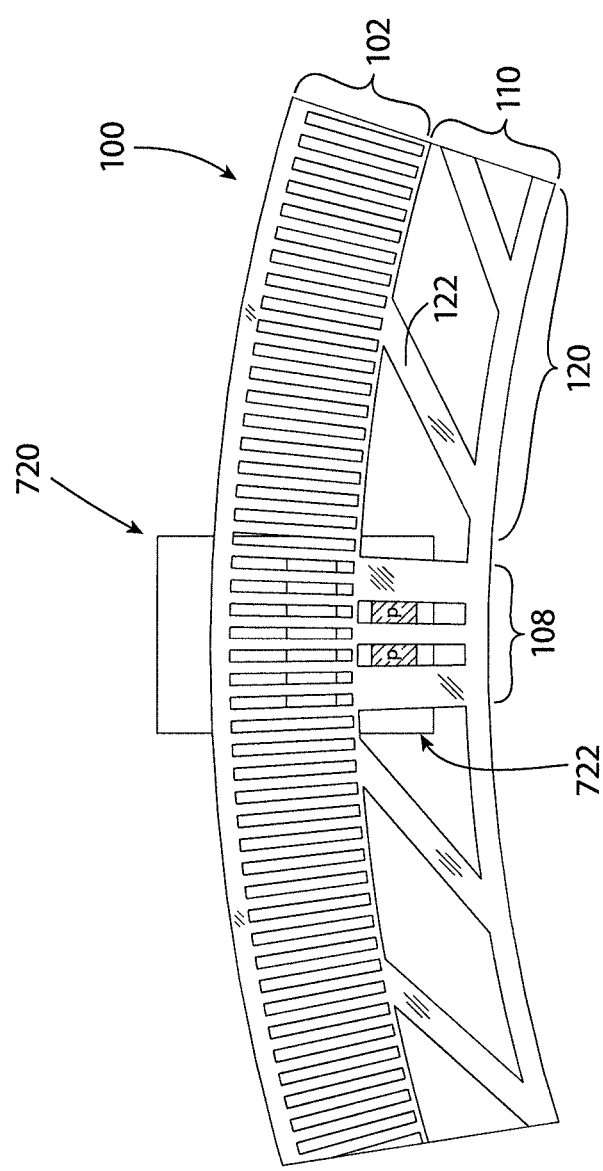
FIG. 11 is a plan view showing the relationship of the metal code wheel of FIG. 3A to the sensor of FIG. 7 at rotation point D on the graph of FIG. 6.

The linear pattern is configured so that when the index track 110 is rotated with respect to the fixed light emitter 23 and sensor 720, and the disk is rotated to an index point, the opaque portions of the index pattern obscure the higher population photodiode types as illustrated in FIG. 11.

FIGS. 8-14 illustrate different rotation points of the code wheel 100 with respect to the sensor 720. It will be appreciated that the sensor pattern 722 is at least partially exposed within the index track 110 of the code wheel. The spacing and pattern of light blocking elements, such as angled strut 122, at no point completely align with the direction of the sensor pattern 722 so that at least a portion of both types of photodiodes are exposed.

Figure 8:
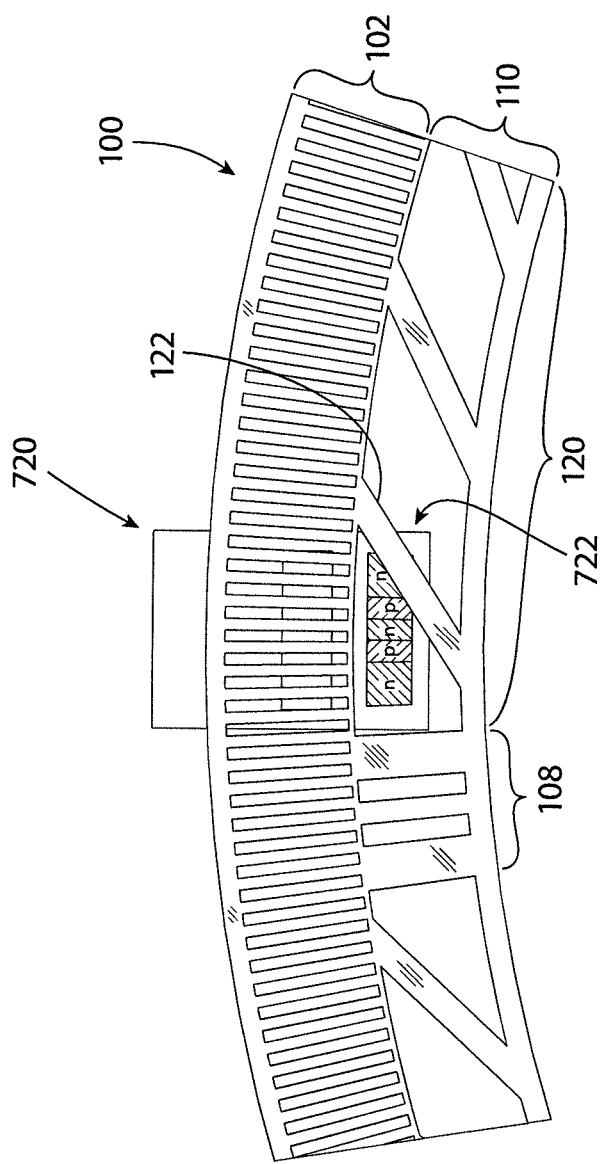
FIG. 8 is a plan view showing the relationship of the metal code wheel of FIG. 3A to the sensor of FIG. 7 at rotation point A on the graph of FIG. 6.

FIG. 8 illustrates the rotation point when the entirety of the sensor pattern 722 is within the support pattern 120 portion of the index track 110 and results in a detector output at point A in the graph of FIG. 6. Although the output is shown as linear outside of the index pattern 108, it is understood that there would be slight variations in the readings as the opaque angled struts 122 obscure various portions of the pattern including one or both types of photodiodes. At no point, however, will the angled struts 122 completely obscure all of one diode type.

Figure 9:
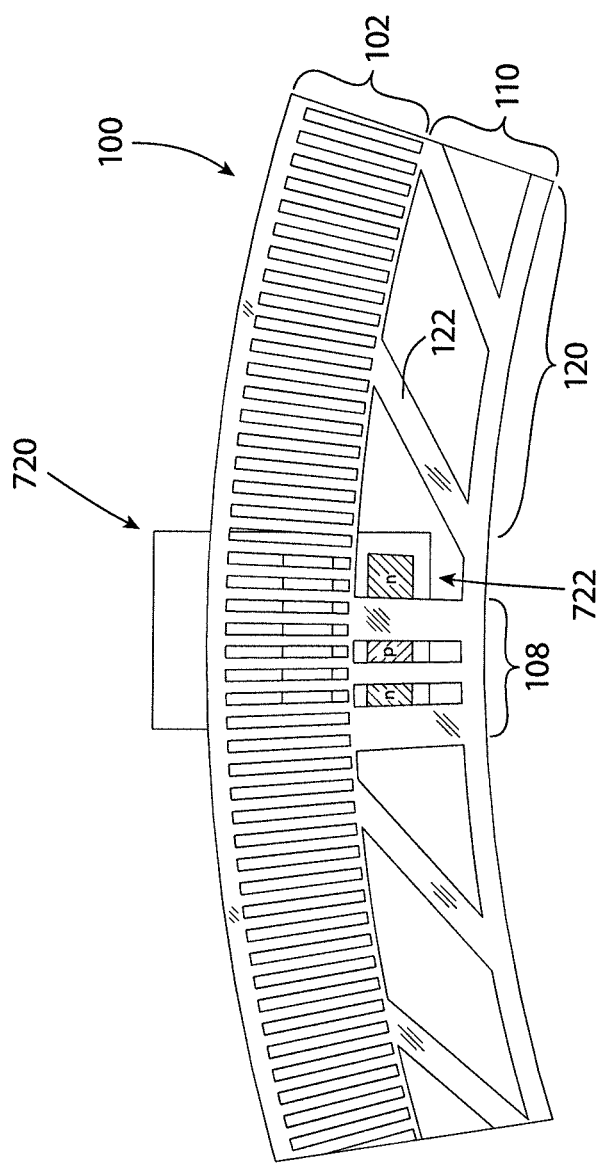
FIG. 9 is a plan view showing the relationship of the metal code wheel of FIG. 3A to the sensor of FIG. 7 at rotation point B on the graph of FIG. 6.

FIG. 9 illustrates a further rotation of the code wheel 100 by approximately four degrees so that a portion of the sensor pattern 722 is within the index pattern 108. The index pattern partially obscures the pattern so that only a small part of the positive photodiodes p is showing while leaving a majority of the negative photodiodes n showing. The sensor output is then detected to be as shown as point B in FIG. 5 with a low output number.

Figure 10:
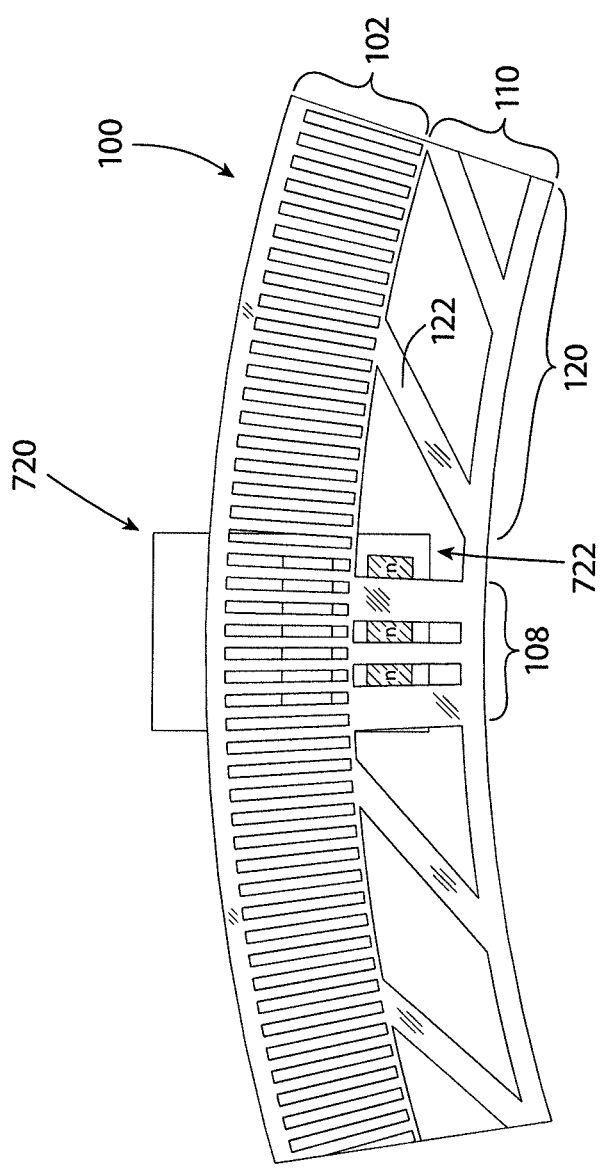
FIG. 10 is a plan view showing the relationship of the metal code wheel of FIG. 3A to the sensor of FIG. 7 at rotation point C on the graph of FIG. 6.

FIG. 10 illustrates yet another rotation of the code wheel 100 where the index pattern obscures all of the positive photodiode pattern p so that only the negative photodiodes n are exposed. The resulting sensor output is thus at its lowest point—e.g. point C in FIG. 6—on the graph.

FIG. 11 illustrates the rotation point in which the index pattern 108 exactly aligns with the sensor pattern 722 so that all of the majority photodetectors—here negative photodetector pattern n—are obscured and only the positive photodetectors p exposed. The sensor output thus peaks at point D in FIG. 6 and an index is counted. The index need not be determined from the peak but can be determined from a threshold reading—say above 0 output current where the number of exposed positive and negative photodetectors are balanced. Alternately, an index can asserted only when a substantial amount of the photodetectors of the first (e.g. n-) type are blocked from receiving light from the emitter by the patterned opaque index portions.

Figure 12:
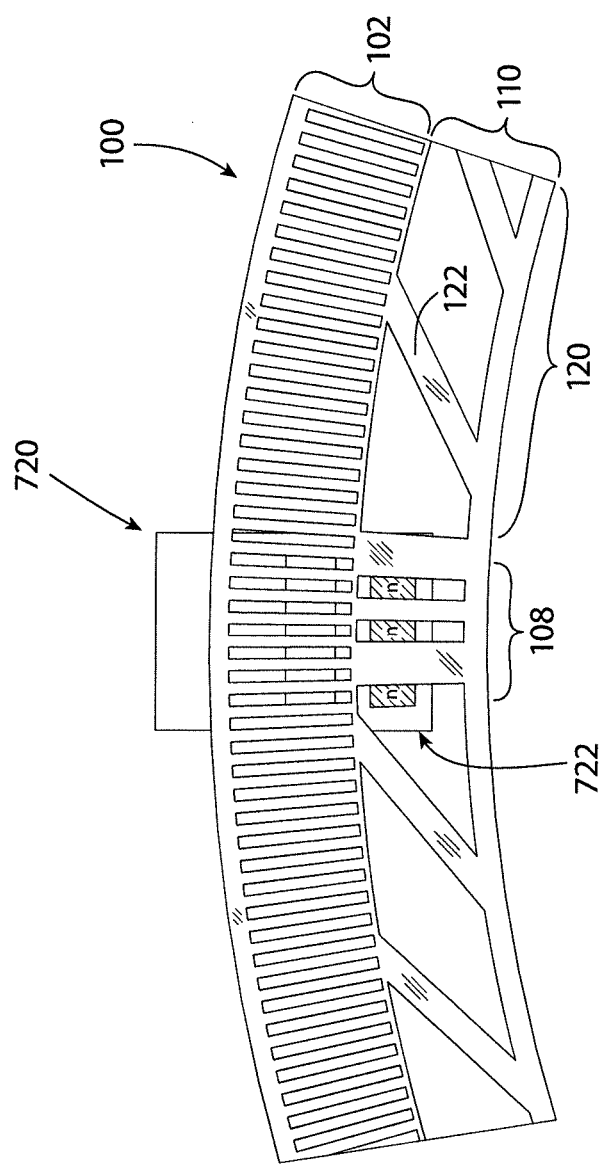
FIG. 12 is a plan view showing the relationship of the metal code wheel of FIG. 3A to the sensor of FIG. 7 at rotation point E on the graph of FIG. 6.

FIG. 12 is the mirror image of FIG. 10 where further rotation of the code wheel 100 causes the index pattern 108 to block all but the majority-type photodetectors (e.g. n-type). The resulting sensor output is thus at its lowest point—e.g. point E in FIG. 6—on the graph.

FIG. 13 illustrates a further rotation of the code wheel 100 so that a portion of the sensor pattern 722 is within the index pattern 108 and the remaining portion within the support pattern 120. The index pattern partially obscures the pattern so that only a small part of the positive photodiodes p is showing while exposing a majority of the negative photodiodes n. The sensor output is then detected to be as shown as point F in FIG. 6 with a low output number—a mirror image to the position of the code wheel 100 as shown in FIG. 9.

Figure 14:
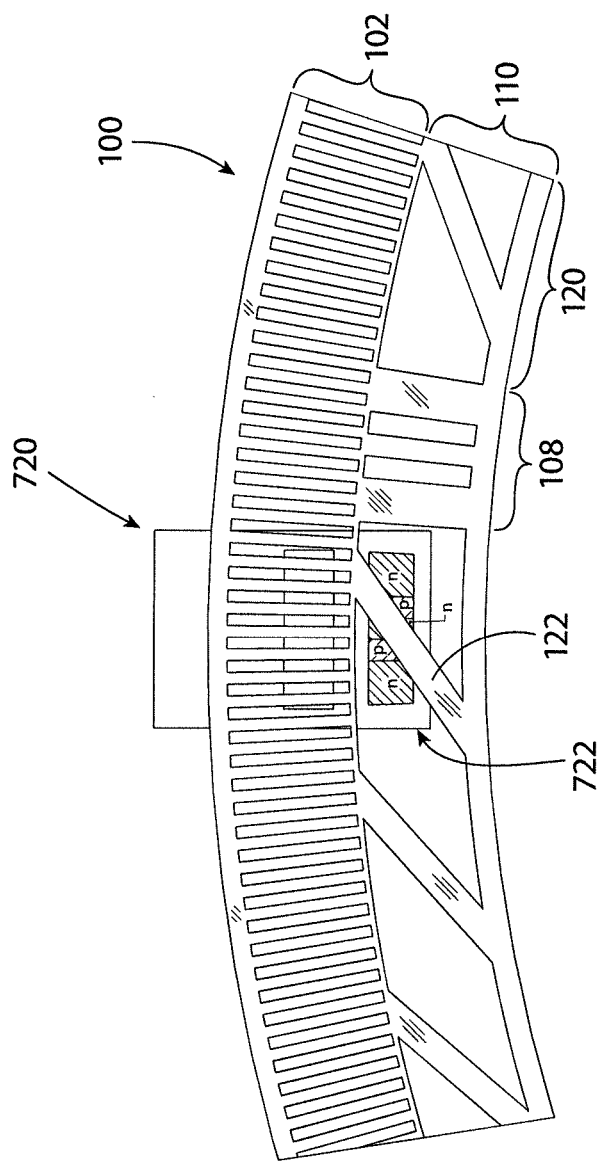
FIG. 14 is a plan view showing the relationship of the metal code wheel of FIG. 3A to the sensor of FIG. 7 at rotation point G on the graph of FIG. 6.

FIG. 14 illustrates yet a further rotation of the code wheel so that the sensor pattern 722 is again completely within the opaque support pattern 120 portion of the index track 110. This results in a detector output at point G in the graph of FIG. 6. As explained above, although the output is shown as linear outside of the index pattern 108, it is understood that there would be slight variations in the readings as the opaque angled struts 122 obscure portions of the pattern including one or both types of photodiodes. The rotation point in FIG. 14 shows the angled strut crossing over several sections of radially-defined sensor pattern at an oblique angle, partially obscuring all photodiode sections and types. At no point, however, will the angled struts 122 completely obscure all of one diode type.

Figure 15:
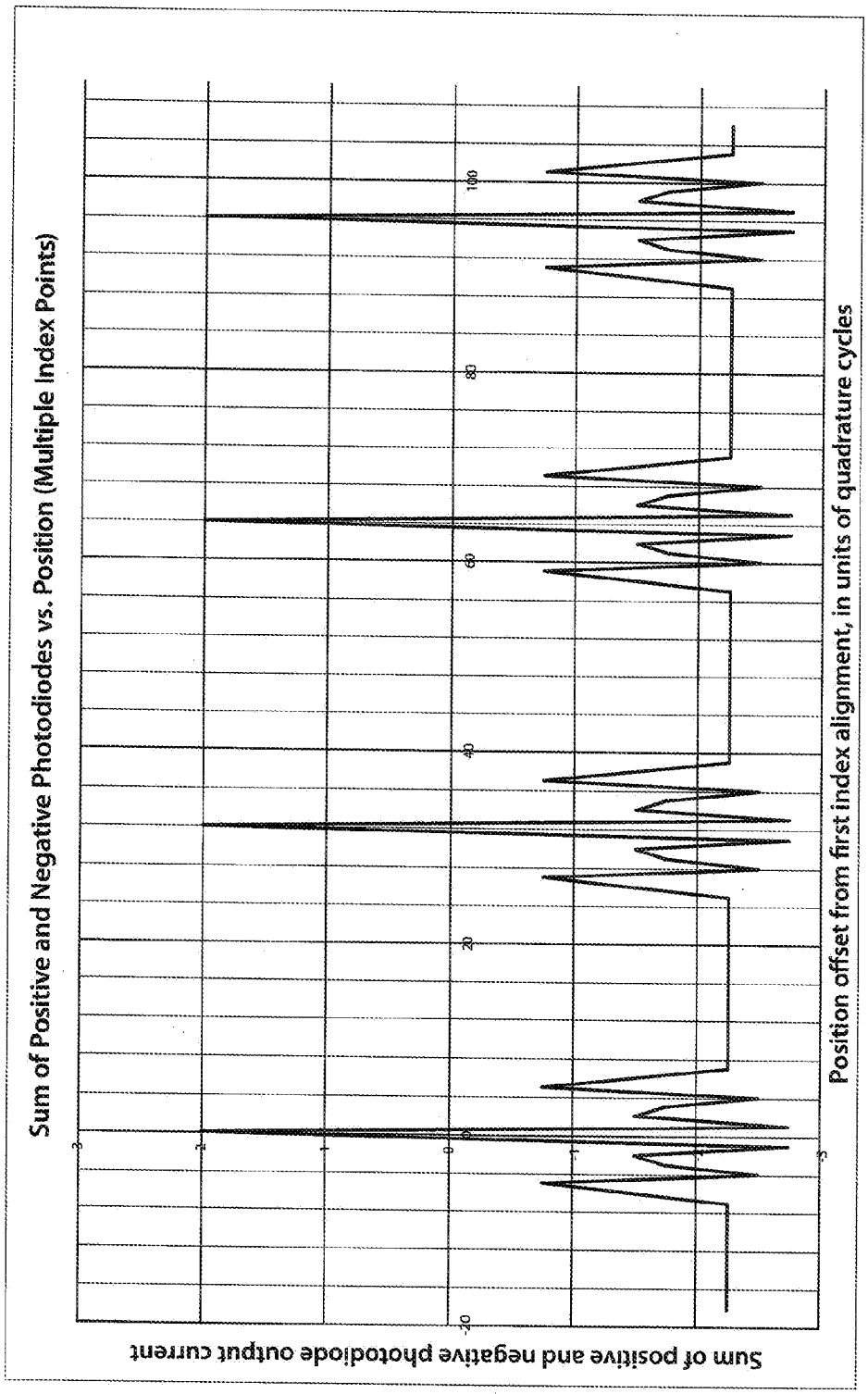
FIG. 15 is a graph showing sensor output as a function of angular position of a code wheel like FIG. 3A but with multiple index points.

FIG. 15 shows a graph like that of FIG. 6 except with multiple index points. That is, instead of there being a single index pattern 108 defined within the index track 110 of code wheel 100, there are several such patterns spaced—preferably evenly—around the circumference of the index track. FIG. 15 illustrates index points spaced about every thirty-two and a half degrees around the code wheel so that there are 11 such points about the code wheel. This can be useful if the code wheel 100 is tied to the turning of a knob with each index point specifying a quantum change, as opposed to an analogue change, in volume from a setting of zero to ten.

Figure 16:
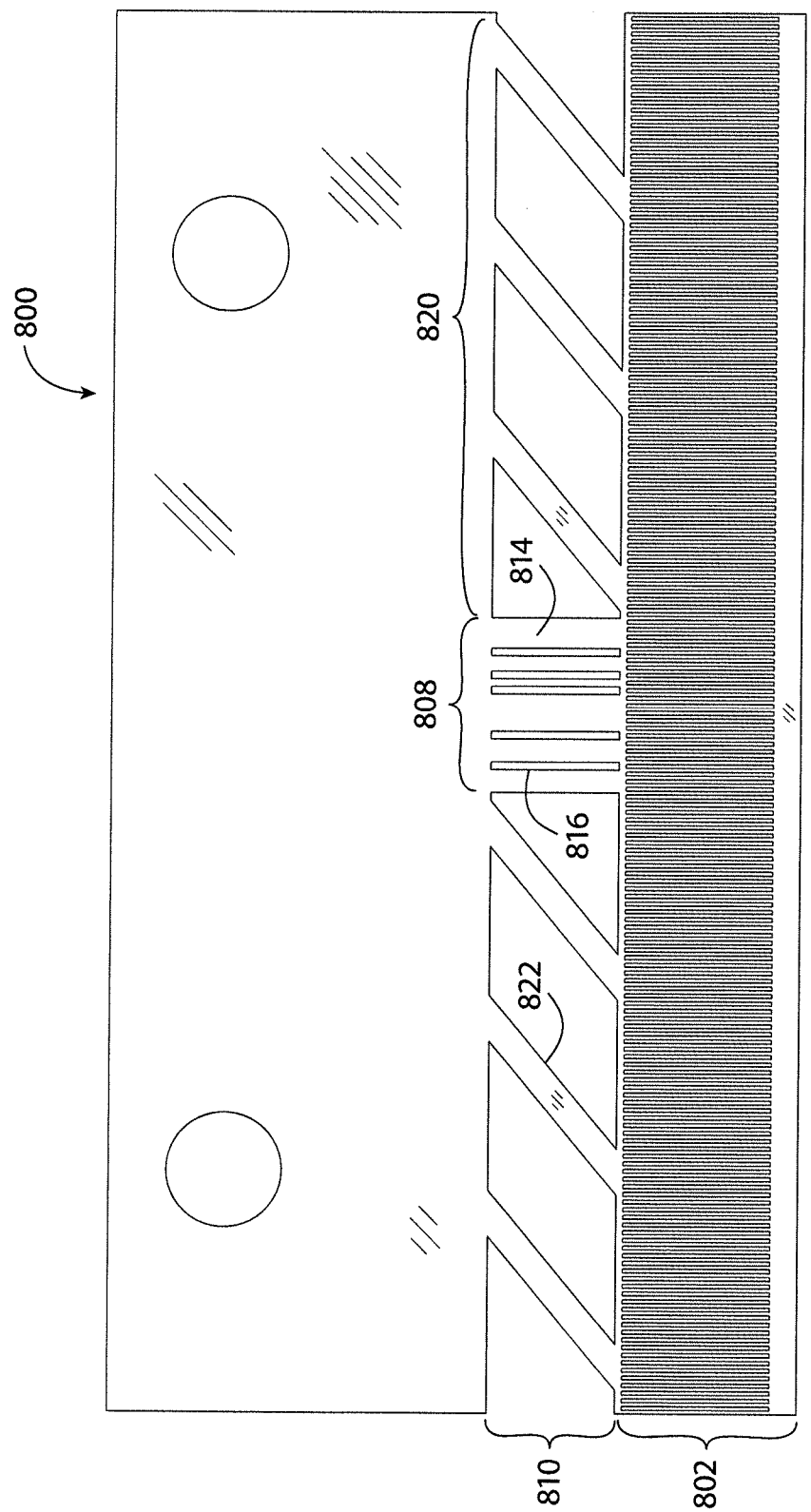
FIG. 16 is a plan view showing a magnified portion of a code strip constructed according to teachings of the invention.

FIG. 16 shows a linear code strip 800 having an opaque body in which is formed an outer quadrature track 802 and an inner index track 810. An index pattern 808 and support pattern 820 are defined within the index track 810. The index pattern 808 is defined along a pre-established length of the index track and includes a linear array of opaque portions 814 and apertures 816 formed between said portions. The support pattern 820 is formed of elements 822 having a different pattern and arrangement from the index pattern 808 so that at any point along the support pattern a sensor pattern (not shown) has both types of photodetectors exposed. This is in contrast with the index pattern that exactly aligns with and obscures only one type of the photodetectors on the sensor when at the index position.

The support pattern can be those contemplated above with reference to FIG. 3A, 4A, or 5A—that is slanted spokes or struts, a honeycomb pattern of obscure portions and apertures, and curved spokes or struts.

The support patterns shown in the embodiments illustrate the common concept of not only including different spacings of the opaque patterns from the index pattern, but also that the support pattern has a different orientation from the index pattern. In the embodiments shown, the orientation changes are where the index pattern is parallel with the short axis of the strip (FIG. 16) or radial with respect to the code wheel (FIGS. 3A-5A). The opaque support patterns shown can be thought of as masks in that they block light from reaching the sensors and thus result in a detectable signal indicating position.

Having described and illustrated the principles of the invention in a preferred embodiment thereof, it should be apparent that the invention can be modified in arrangement and detail without departing from such principles. We claim all modifications and variation coming within the spirit and scope of the invention.

What is claimed is:

1. An optical encoder mask, comprising:
   an opaque body;
   an outer track adjacent a peripheral edge of the mask;
   an inner index track defined by a first pattern of light blocking elements located within a width and at a first position of the index track and pattern apertures formed through the body between the light blocking elements so that light emitted on one face of the mask passes through the pattern apertures and falls upon photodetectors located adjacent an opposite face of the mask; and
   an opaque support pattern of elements located within the inner track outside of the index track, said support pattern defined by light blocking elements and apertures so that, within any position of the support pattern equal in width to the index track to the arc of the index track, at least a portion of the light emitted onto one face of the mask passes through the apertures of the support pattern and falls upon the photodetectors located adjacent the opposite face of the mask,
   wherein the opaque body is a disk, and wherein an inner index track subtends an arc within an annular band interposed between the outer track and an axis of the disk, the inner index track defined by a first pattern of radial light-blocking elements located at a first angular position of the index track and pattern apertures formed through the disk between the light-blocking elements so that light emitted on one face of the disk passes through the pattern apertures and falls upon photodetectors located adjacent an opposite face of the disk; and
   an opaque support pattern of non-radial elements located within the annular band outside of the arc in which the index track is located, said support pattern defined by light blocking elements and apertures so that, within any portion of the support pattern equal in width to the arc of the index track, at least a portion of the light emitted onto one face of the disk passes through the apertures of the support pattern and falls upon the photodetectors located adjacent the opposite face of the disk.

2. The optical encoder mask of claim 1, wherein the opaque disk is made of metal.

3. The optical encoder mask of claim 2, wherein the opaque support pattern includes metal spokes slanted with respect to a radial direction of the disk and having a width less than a width of the arc subtended by the inner index track.

4. The optical encoder mask of claim 3, wherein the spokes are straight.

5. The optical encoder mask of claim 3, wherein the spokes are curved away from any radial direction of the disk.

6. The optical encoder mask of claim 2, wherein the opaque support pattern includes a honeycomb pattern of apertures formed therethrough so that a plurality of apertures within the honeycomb pattern are defined within any portion of the support pattern equal in width to the arc of the index track.

7. The optical encoder mask of claim 6, wherein the apertures are narrower in width that the arc subtended by the index track.

8. The optical encoder mask of claim 1, wherein the outer track is a quadrature track.

9. The optical encoder mask of claim 1, wherein the light blocking elements of the support pattern include a plurality of spokes where each spoke subtends an angle equal to the angle of the index, and the width of the spoke is such that maximum obscuration of the index sensor is around 20%, wherein a radial line drawn from the center of rotation would pass through at most one slanted spoke.

10. An optical encoder mask, comprising:
    an opaque body;
    an outer track adjacent a peripheral edge of the mask;
    an inner index track defined by a first pattern of light blocking elements located within a width and at a first position of the index track and pattern apertures formed through the body between the light blocking elements so that light emitted on one face of the mask passes through the pattern apertures and falls upon photodetectors located adjacent an opposite face of the mask; and an opaque support pattern of elements located within the inner track outside of the index track, said support pattern defined by light blocking elements and apertures so that, within any position of the support pattern equal in width to the index track to the arc of the index track, at least a portion of the light emitted onto one face of the mask passes through the apertures of the support pattern and falls upon the photodetectors located adjacent the opposite face of the mask, wherein the opaque body is a strip having a long axis defined along the length of the strip and short axis perpendicular to the long axis and including an inner index track subtending a width within the inner track and having a linear array of opaque portions and apertures formed between said portions and formed parallel to the short axis of the opaque body; and an opaque support pattern of elements located within the inner track outside of the width in which the index track is located, said support pattern defined by light blocking elements and apertures not formed parallel to the short axis of the opaque body so that, within any portion of the support pattern equal in width to the width of the index track, at least a portion of the light emitted onto one face of the strip passes through the apertures of the support pattern and falls upon the photodetectors located adjacent the opposite face of the strip.

11. An optical encoder, comprising:

encoder disk having an outer track and inner index track, the inner track defined within an annular band of the disk and having an index pattern subtending an arc of the annular band with patterned opaque index portions and apertures formed between said portions, and a support pattern within the annular band outside of the index pattern;

a light emitter located adjacent one face of the encoder disk and configured to project light onto the encoder disk and through the apertures; and photodetectors located adjacent an opposite face of the encoder disk from the light emitter, said photodetectors arranged in a photodetector pattern with an arrangement of a first type of photodetector matched with the patterned opaque index portions and an arrangement of a second type of photodetector matched with the apertures formed between said portions, wherein the support pattern on the encoder disk includes light blocking elements and apertures configured whereby, within any portion of the support pattern equal in width to the arc of the index pattern, at least a portion of the light emitted onto one face of the disk passes through the apertures of the support pattern and falls upon the photodetectors located adjacent the opposite face of the disk so that, when the support pattern is interposed between the light emitter and the photodetectors, more light falls on the photodetectors of the first type than of the second type.

12. The optical encoder of claim 11, wherein the first type of photodetector is a negative photodiode and the second type of photodetector is a positive photodiode.

13. The optical encoder of claim 12, wherein the first type of photodetectors outnumber the second type of photodetectors.

14. The optical encoder of claim 11, wherein an index is asserted only when a substantial amount of the photodetectors of the first type are blocked from receiving light from the emitter by the patterned opaque index portions.

15. The optical encoder of claim 11, wherein the encoder disk is metal and the apertures are holes formed completely through the disk.

16. The optical encoder disk of claim 11, wherein the light blocking elements include spokes slanted with respect to a radial direction of the disk and having a width less than a width of the arc subtended by the index pattern.

17. The optical encoder of claim 16, wherein the light blocking elements of the support pattern include a plurality of spokes where each spoke subtends an angle equal to the angle of the index, and the width of the spoke is such that maximum obscuration of the index sensor is around 20%, wherein a radial line drawn from the center of rotation would pass through at most one slanted spoke.

18. The optical encoder disk of claim 11, wherein the opaque support pattern includes a honeycomb pattern of apertures formed therethrough so that a plurality of apertures within the honeycomb pattern are defined within any portion of the support pattern equal in width to the arc subtended by the index pattern.

\* \* \* \* \*